(12) United States Patent
Buravalla et al.

(10) Patent No.: US 7,669,918 B2
(45) Date of Patent: Mar. 2, 2010

(54) TUNABLE VEHICLE STRUCTURAL MEMBERS AND METHODS FOR SELECTIVELY CHANGING THE MECHANICAL PROPERTIES THERETO

(75) Inventors: Vidyashankar R. Buravalla, Banglore (IN); Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1118 days.

(21) Appl. No.: 11/008,424

(22) Filed: Dec. 9, 2004

(65) Prior Publication Data

US 2006/0125291 A1 Jun. 15, 2006

(51) Int. Cl.
*B60J 11/00* (2006.01)

(52) U.S. Cl. .......................... 296/187.03; 296/187.09; 296/187.11; 296/187.12

(58) Field of Classification Search ................. 293/132; 296/187.01, 187.03, 187.09, 187.11, 187.12
See application file for complete search history.

(56) References Cited

U.S. PATENT DOCUMENTS

2005/0104391 A1* 5/2005 Browne et al. .............. 293/132

* cited by examiner

*Primary Examiner*—Lori L Lyjak

(57) ABSTRACT

Tunable structural member for a vehicle generally comprises an active material adapted to selectively undergo a change in at least one attribute in response to an activation signal. The change in the at least one attribute results in a change in the mechanical properties of the tunable structural member. Active materials generally include shape memory alloys, shape memory polymers, magnetorheological fluids and elastomers, piezoelectrics, electroactive polymers, and the like.

25 Claims, 2 Drawing Sheets

TUNABLE VEHICLE STRUCTURAL MEMBERS AND METHODS FOR SELECTIVELY CHANGING THE MECHANICAL PROPERTIES THERETO

BACKGROUND

The disclosure generally relates to tunable vehicle structural members, and more particularly, to tunable vehicle structural members comprising an active material adapted to undergo a change in at least one attribute in response to an activation signal.

Numerous methods have been employed to adjust or modify the stiffness and crush strength of vehicle structural members. Such methods include the use of local or global changes in the material and cross sectional geometry of the vehicle structures, and foam filling of hollow cross sections. However, all of these methods provide a fixed response and are generally not situationally tunable on demand. As such, the methods are limiting and cannot be altered to adjust to different operating requirements for different impact scenarios.

Accordingly, there remains a need for a method to enable the on-demand selective adjustment of the mechanical properties of vehicle structural members.

BRIEF SUMMARY

Disclosed herein are vehicle structural members and methods for selectively changing mechanical and/or structural properties thereto. A tunable vehicle structural member comprises at least one active material portion adapted to selectively undergo a change in at least one attribute in response to an activation signal, wherein the change in at least one attribute changes a mechanical and/or structural property of the vehicle structural member.

A method for selectively changing a mechanical property of a vehicle structural member comprises applying an activation signal to an active material, wherein the active material is in operative communication with the vehicle structural member; and causing a change in at least one attribute of the active material in response to the activation signal, wherein a mechanical and/or structural property of the vehicle structural member changes with the change in the at least one attribute of the active material.

In one embodiment, a method for providing a predetermined buckling path for a vehicle structural member comprises applying an activation signal to at least one active material, wherein the at least one active material is in operative communication with non-active portions of the vehicle structural member; and changing at least one attribute of the active material in response to the activation signal, wherein the change in the at least one attribute defines the predetermined buckling path for the vehicle structural member.

In yet another embodiment, a method for providing a point or region of crush initiation for a vehicle structural member comprises applying an activation signal to at least one active material, wherein the at least one active material is in operative communication with non-active portions of the vehicle structural member; and changing at least one attribute of the active material in response to the activation signal, wherein the change in the at least one attribute defines the point or region of crush initiation for the vehicle structural member.

The above described and other features are exemplified by the following figures and detailed description.

BRIEF DESCRIPTION OF THE DRAWINGS

Referring now to the Figures, which are exemplary embodiments and wherein like elements are numbered alike.

DETAILED DESCRIPTION

Disclosed herein are tunable vehicle structural members. As used herein, the term "vehicle structural member" refers to various parts that form the vehicle, which include, but are not limited to, various pillars, reinforcing members, rails, framing members, sway bars, vehicle chassis members, bumper components, strut assemblies components, and the like. In addition, the vehicle structural member may comprise panels or shell-like structures within the vehicle such as, for example, door panels, hood panels, body panels, deck lids, and the like. Other suitable parts or components of the vehicle will be apparent to those skilled in the art in view of this disclosure.

The vehicle structural member generally comprises an active material, which can be selectively activated to provide the change in stiffness and strength of the structural members. The active material may form the structural member in its entirety or may form localized regions or may form coatings or thin films that cooperatively and selectively change the stiffness, strength, and/or shape of an underlying structure (e.g., panels) depending on the desired application. As used herein, the term "active material" refers to a material that exhibits a change in at least one attribute such as a shape, a dimension, a shear force, a shape orientation, a phase, a flexural modulus, and a combination comprising at least one of the foregoing properties upon application of an activation signal.

Suitable active materials include, but are not limited to, shape memory alloys (SMAs), shape memory polymers (SMPs), magnetic shape memory materials (MSMA), piezoelectric materials, dielectric elastomers, electroactive polymers, magnetorheological (MR) elastomer, and the like, as well as combinations comprising at least one of the foregoing active materials.

Figure 1:
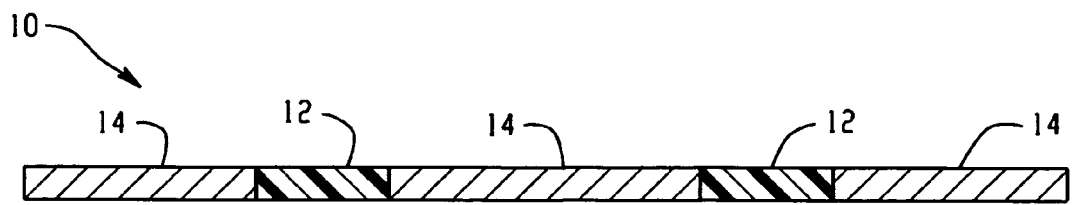
FIG. 1 is a schematic representation of a cross section of a vehicle structural member comprising localized sections of an active material prior to activation in accordance with one embodiment of the disclosure.
Figure 2:
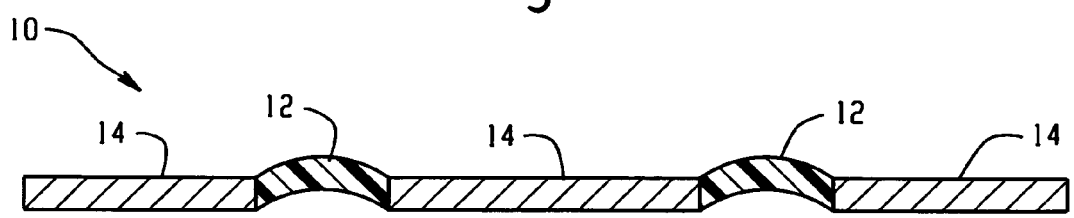
FIG. 2 is the schematic representation of the cross section of the vehicle structural member of FIG. 1 upon activation of the active material to define a predetermined buckling path.

Turning now to FIGS. 1 and 2, there is shown an exemplary vehicle structural member 10 comprising localized regions 12 formed of the active material in operative communication with a non-active structure 14. FIG. 1 illustrates the structural member 10 in the non-activated state whereas FIG. 2 illustrates the structural member in the activated state. The non-active structure 14 is formed of a material suitable for the intended application of the vehicle structural member, e.g., a sway bar formed of steel. On applying an activation signal to the localized regions 12 of active material, the localized regions 12 can provide a predefined buckling path for energy dissipation. As such, the location of the localized regions 12 will vary depending on the desired buckling path. In this manner, impact of an object can cause the vehicle structural member 10 to buckle along the predefined path, rendering control as well as absorption of the kinetic energy associated with the impact event so as to minimize damage to components outside of the buckling path. In the event the impact event does not mature, the localized regions 12 can be deactivated so as to maintain the mechanical integrity of the vehicle structural member 10. As described, the vehicle structural member 10 can function as a crush initiator. A vehicle structural member 10 with a properly located crush initiator has greater energy absorption than a vehicle structural member without such initiators. In one case, the vehicle structural member absorbs energy by undergoing a localized crush where the initiator (active material) is located, in modes such as transverse shearing, lamina bending, local buckling, face wrinkling, and the like. The crush initiator leads to a localized crush of the vehicle structural member, and thus, the vehicle structural member does not fail at other places. In a second case, the vehicle structural member absorbs energy not just at a localized region but over a significant fraction of its length. It does this by undergoing progressive folding, such as in accordion like waves, the initiation of this accordion folding (crush) at the leading end of the structural member such as through the use of an initiator as invented herein being critical to this progressive folding and accompanying energy dissipation occurring over a significant fraction of the length of the structural element.

By incorporating the crush initiator by means of the localized regions 12, a site of collapse (or initiation of progressive crush) of the vehicle structural member 10 can be selected. The active material can be placed at any location in the vehicle structural member 10 depending on the desired characteristics which include, but are not limited to, crush strength, crush distance, and the like. Multiple crush initiators can be created along separate portions of the vehicle structural members 10 to crush at several locations or multiple crush initiators can be created proximate to one another at a single portion of the vehicle structural member to crush at that selected location. The number of crush initiators can vary, depending on the desired characteristics which include, but are not limited to, crush strength, crush distance, and the like. Suitable approaches for using active materials for the creation of crush initiators include, but are not limited to, localized circumferential bands of the active material on the vehicle structural member, localized externally attached bands of the active material on the vehicle structural member, externally attached patches of the active material on the vehicle structural member, entire vehicle structural member of the active material, and the like, as well combinations comprising at least one of the foregoing approaches.

In an alternative embodiment, a selective change in the flexural modulus of the active material accompanied by a phase change from, for example, a martensite to austenite phase transformation in the case of shape memory alloys can be employed to selectively increase stiffness of the vehicle structural member, provide a crush initiation shift, provide a shift in the mode of crush initiation, and/or various combinations thereof. For example, a vehicle structural member 10 with an active material at one location can be activated to act as a point of crush initiation at a lower temperature because of its low modulus in the martensite phase. In an impact event situation in which crush at that location is not desired, rapid heating of the active material could increase the stiffness of that location such that the crush would occur at a different location in the structural member or in a different member. By selectively activating and deactivating selected localized regions of the active material, the kinetic energy associated with the impact event can be controlled and dissipated as may be desired.

Figure 3:
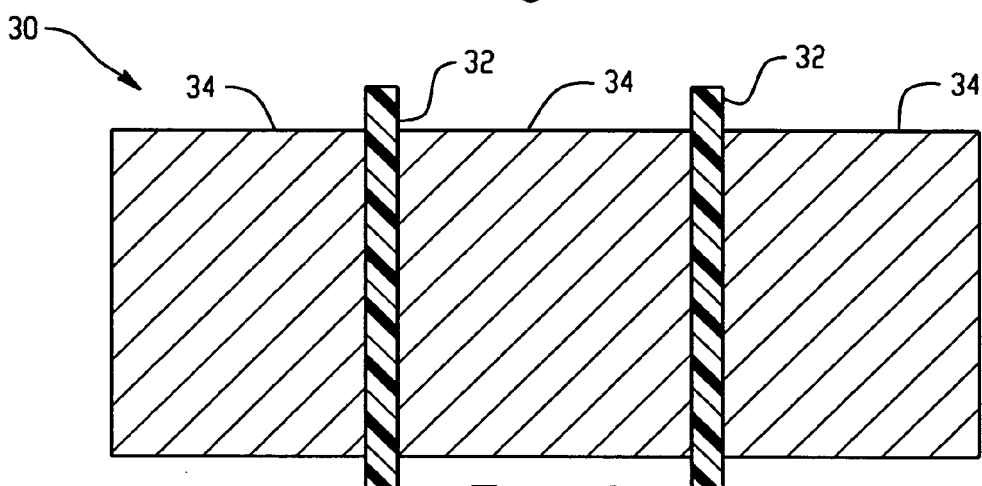
FIG. 3 is a schematic representation of a cross section of a vehicle structural member comprising localized sections of an active material prior to activation in accordance with one embodiment of the disclosure.
Figure 4:
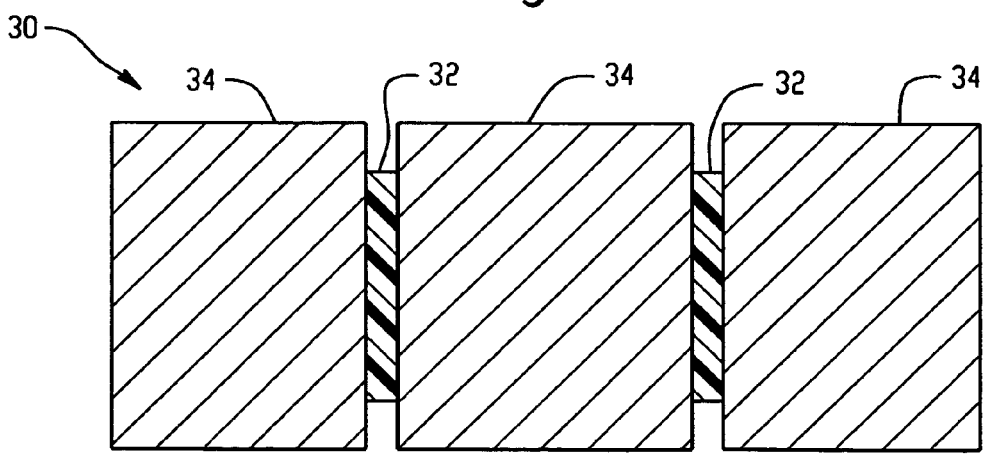
FIG. 4 is the schematic representation of the cross section of the vehicle structural member of FIG. 3 upon activation of the active material to define a predetermined buckling path.

In another embodiment as shown in FIGS. 3 and 4, an exemplary vehicle structural member 30 is in the form of a plate-like or shell-like structures 34 with proximate circumferential bands, wraps, patches, and/or the like of active material 32. FIG. 3 illustrates the structural member 30 prior to activation whereas FIG. 4 illustrates the structural member upon activation. On applying an activation signal, a change in the cross sectional geometry (or length of a circumferential wrap, where appropriate) of the active material 32 is effected and results in locally buckled zones of the structure 34 (as shown more clearly in FIG. 4) that can act as crush initiators. These locally buckled zones facilitate energy absorption through the initiation of the desired crush morphology upon an impact event.

Figure 5:
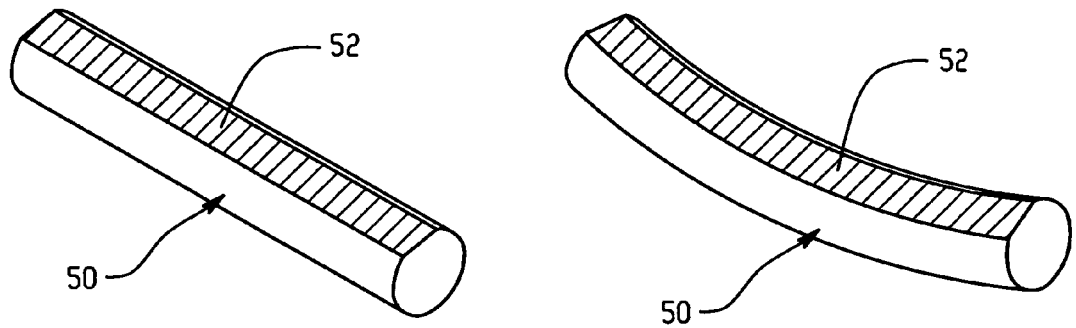
FIG. 5 shows a perspective view of a vehicle structural member comprising an active material prior to activation and after activation in accordance with one embodiment of the disclosure.

In other embodiments, localized surface and/or wall morphing can be employed to facilitate energy absorption. That is, upon activation of the active material a change in the gross geometry occurs in a longitudinal direction. For example, a longitudinal morphing in the form of an outward bending in a vehicle structural member would increase the crush distance accompanied by an increase in the stiffness due to the change in the modulus. Suitable approaches for using active materials for longitudinal morphing for resulting in a change in the crush distance and the stiffness include, but are not limited to, longitudinal segments of the active material on the vehicle structural member, localized circumferential bands of the active material on the vehicle structural member, externally attached patches of the active material on the vehicle structural member, entire vehicle structural member of the active material, and the like, as well as combinations comprising at least one of the foregoing approaches. An example of this is illustrated in FIG. 5. As shown, the structural member 50 can include longitudinal strips of the active material, wherein shortening of the length of the active material 52 generates significant bending stresses or compressive stresses within the structural member itself so as to morph the longitudinal shape of the member. As a result, the morphed geometry of the structural member 50 can variously provide enhanced stiffness and increased crush distance directly as well enhanced stiffness and increased energy absorption through any accompanying change in the modulus of the active material.

Alternatively, the active material can be adapted to provide a change in the cross sectional geometry of the structural member. This change is termed as "cross-sectional morphing" and such a change results in a change in the stiffness and/or crush strength/energy absorption capability of the vehicle structural member. Suitable approaches for using active materials for cross section morphing for resulting in a change in stiffness/crush strength include, but are not limited to, longitudinal segments of the active material on the vehicle structural member, entire vehicle structural member of the active material, and the like, as well as combinations comprising at least one of the foregoing approaches.

Figure 6:
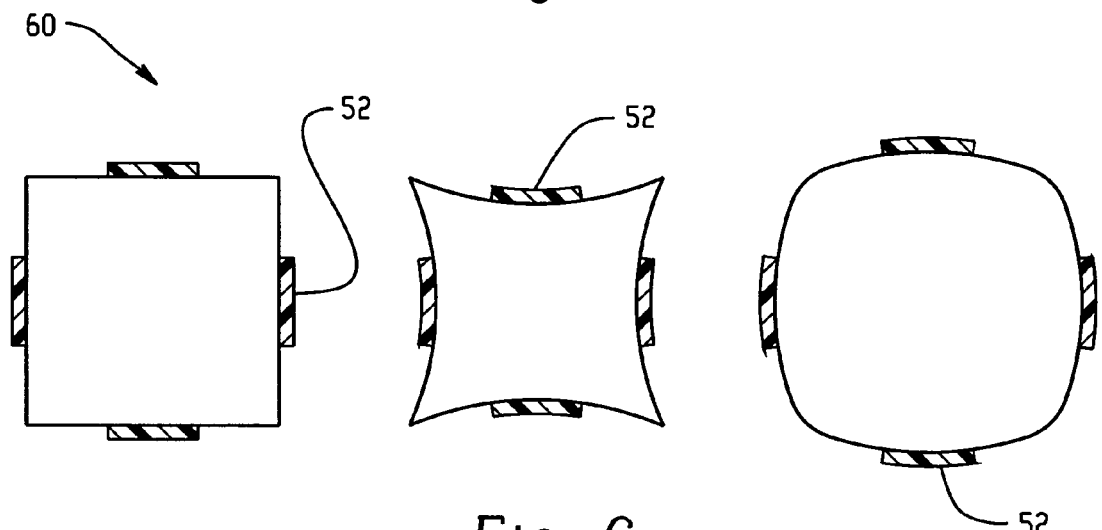
FIG. 6 shows schematic representations of cross sections of a vehicle structural member comprising an active material prior to activation and after activation in accordance with one embodiment of the disclosure.
Figure 7:
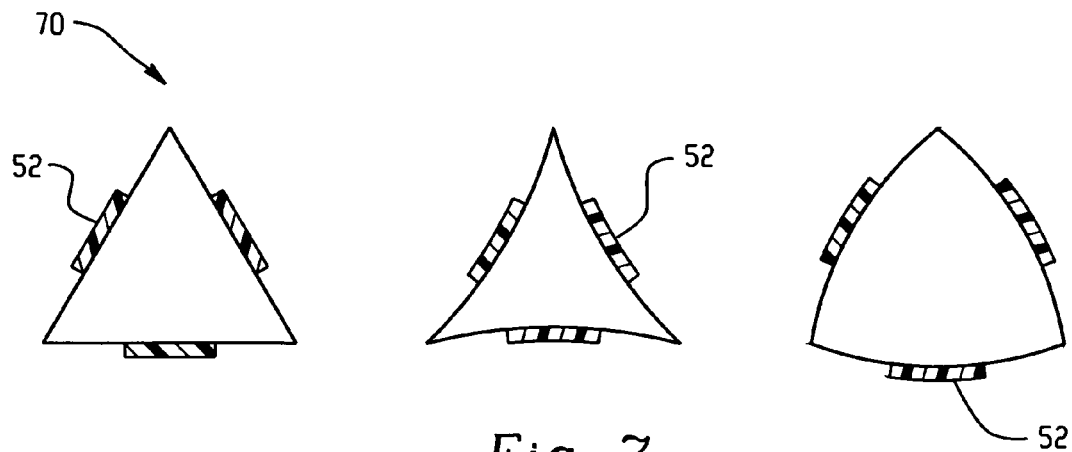
FIG. 7 shows schematic representations of cross sections of a vehicle structural member comprising an active material prior to activation and after activation in accordance with one embodiment of the disclosure.

The shape of the morphed surface/wall is not intended to be limited to any particular shape and/or configuration, which can be readily manipulated by selective placement of the active material. For example, various other morphed surfaces/walls are illustrated in FIGS. 6 and 7. In each of these embodiments, the active material 52 is selectively positioned and activated to provide a desired configuration and/or shape of the cross section when the active material is activated.

Activation of the active material will depend on the type of active material. Suitable activation signals may comprise a thermal activation signal, a magnetic activation signal, an electrical activation signal, and the like, as well as combinations comprising at least one of the foregoing activation signals. For example, shape memory polymers, and shape memory alloys may be activated by a thermal activation signal, e.g., heat may be supplied using hot gas (e.g., air), steam, hot liquid, radiative heat transfer microwave heating, resistive heating by an electrical current and the like.

Producing the activation signal may comprise sensing an increased probability of an impact event in the near or immediate future, the occurrence of an impact event, manual activation by an occupant or a person servicing the vehicle, electronic activation of a built-in logic control system such as for example, activation of a vehicle stability enhancement system (VSES), turning on or off the ignition, and the like. Sensing the impact event may be accomplished with an impact sensor, sensing of an increased probability that an impact event may occur in the near future may be accomplished with a pre-impact sensor such as radar, vision systems, activation of anti-lock braking systems (ABS), and the like.

Desirably, the change in the property of the active material remains for the duration of the applied activation signal. Also desirably, upon discontinuation of the activation signal, the property reverts substantially to its original form prior to the change. In this manner, reversibility can advantageously occur.

Suitable SMAs can exhibit a one-way shape memory effect, an intrinsic two-way effect, or an extrinsic two-way shape memory effect depending on the alloy composition and processing history. The two phases that occur in SMAs are often referred to as the martensite and austenite phases. The martensite phase is a relatively soft and easily deformable phase of the shape memory alloys, which generally exists at lower temperatures. In contrast, the austenite phase occurs at higher temperatures and generally refers to a stiffer phase. An intermediate phase of the shape memory alloys, which is sometimes referred to as the "R phase", also exhibits characteristic properties that can be exploited to obtain desired shape and/or stiffness changes. A phase changes from the martensite phase to the austenite phase results in an increase in the stiffness and energy absorption characteristics of the vehicle structural member. Suitable approaches for using active materials for increasing the stiffness of the vehicle structural member include, but are not limited to, localized sections of the active material on the vehicle structural member, externally attached strips of the active material on the vehicle structural member, externally attached patches of the active material on the vehicle structural member, internally attached strips of the active material in the vehicle structural member, internally attached patches of the active material in the vehicle structural member, entire vehicle structural member of the active material, internal and/or external coatings/films of the active material and the like, elements of active material "embedded" within or internal to the structural member an example being sma wires within a plastic or polymer matrix, as well as combinations comprising at least one of the foregoing approaches.

Shape memory materials formed from shape memory alloy compositions that exhibit one-way shape memory effects do not automatically reform, and depending on the shape memory material design, will likely require an external mechanical force to reform the shape orientation that was previously exhibited. In the case of structural members whose geometry has been altered through elastic deformation alone by the action of the SMA, this external force can be simply the elastic restoring force of the structural member itself Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. The shape recovery process occurs over a range of from just a few to many degrees depending on the particular nature of the shape memory alloy and the start or finish of the transformation can be controlled to within a degree or two depending on the desired application and alloy composition. Another factor that alters the transformation temperature is the mechanical stress that the material is subjected to. By suitably applying a mechanical load, the transformation temperature could be suitably increased or decreased. The mechanical properties of the shape memory alloy vary greatly over the temperature range spanning their transformation, providing the shape memory material with shape memory effects as well as high damping capacity. The inherent high damping capacity of the shape memory alloys can be used to further increase the energy absorbing properties.

Although reference has been made to thermal activation of the shape memory alloys, the use of magnetic activation, individually or in combination with the thermal activation, may also be suitable for those shape memory alloys compositions that are magnetic. The magnetic shape memory effect differs from the above noted thermoelastic effect in that the change in modulus and/or shape orientation is believed to occur within the martensite phase or within an intermediate orthorhombic crystalline phase. The shape of the shape memory alloy changes when twin structures oriented favorably relative to the magnetic field grow at the expense of the other twin structures in the material. Advantageously, in some applications that are time sensitive, the use of magnetic activation may be preferred in view of the faster response time than the traditional temperature-induced response that occurs upon thermal activation Other suitable active materials are SMPs. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus.

Suitable SMA's include, but are not limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark Flexinol from Dynalloy, Inc.

Generally, SMP are co-polymers comprising at least two different units which may be described as defining different segments within the co-polymer, each segment contributing differently to the flexural modulus properties and thermal transition temperatures of the material. "Segment" refers to a block, graft, or sequence of the same or similar monomer or oligomer units which are copolymerized to form a continuous crosslinked interpenetrating network of these segments. These segments may be crystalline or amorphous materials and therefore may be generally classified as a hard segment(s) or a soft segment(s), wherein the hard segment generally has a higher glass transition temperature (Tg) or melting point than the soft segment.

Each segment then contributes to the overall flexural modulus properties of the shape memory polymer (SMP) and the thermal transitions thereof, the hard segments tending to increase and the soft segments tending to decrease both the flexural modulus properties and the temperatures associated with their changes. When multiple segments are used, multiple thermal transition temperatures may be observed, wherein the thermal transiton temperatures of the copolymer may be approximated as weighted averages of the thermal transiton temperatures of its comprising segments.

The previously defined or permanent shape of an SMP can be set by melting or processing the polymer at a temperature higher than the highest thermal transition temperature for the shape memory polymer or its melting point, followed by cooling below that thermal transition temperature. The temperature necessary to set the permanent shape is preferably of about 100 to about 300 degree centigrade (° C.). A temporary shape can be set by heating the material to a temperature higher than any Tg or thermal transition temperature of the shape memory polymer, but lower than the highest Tg or its melting point. The temporary shape is set by applying an external stress while processing the material above the Tg, but below the highest thermal transition temperature or melting point of the shape memory material followed by cooling to fix the shape.

The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment are of about −63° C. to about 160° C.

SMPs may contain more than two transition temperatures. A shape memory polymer composition comprising a hard segment and two soft segments can have three transition temperatures: the highest transition temperature for the hard segment and a transition temperature for each soft segment.

Most SMPs exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces.

SMPs can be configured in many different forms and shapes. The temperature needed for permanent shape recovery can be set at any temperature of about −63° C. to about 160° C. Engineering the composition and structure of the polymer itself can allow for the choice of the selected temperature for a desired application. In one embodiment, the selected temperature for shape recovery is greater than or equal to about 70° C., or, more specifically greater than or equal to about 80° C., and even more specifically greater than or equal to about 90° C.

Suitable SMPs include, but are not limited to, thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

Aside from strict shape recovery, any material that can be made to linearly expand or contract may be used to produce a bending actuator by combining this material with a non-active elastic member. In the literature, this is generally referred to as a unimorph actuator. If both components are made of the same material but made to deform in opposite directions, the material becomes a bimorph.

Bending to the left or right can be induced by using a material that expands or contracts, respectively. In the bimorph, either direction can also be achieved depending on orientation of the active layers. A unimorph may be created by using a shape memory alloy, conducting polymer, electrostrictive polymer, or other axially straining material, along with an elastic component that causes bending couple to be created. The elastic member can belong to many material classes including metallic alloys, polymers, and ceramics. Preferred materials are those which exhibit large elastic strain limits, and those which can efficiently store mechanical energy. Secondary considerations include those which may be easily bonded to the active material, have properties that are acceptable in the working temperature range, and have adequate toughness to survive repeated actuation. A bimorph may be created for any material in which the material may be driven into both extension and compression depending on the driving signal. Piezoelectric materials can be used for this effect. Ionic polymer actuators such as IPMC and conducting polymers intrinsically exhibit this effect due to the transport of ionic species that cause swelling across a membrane. Therefore, these materials are preferably used for this type of deformation.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example is an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(meth-acrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS, and mixtures thereof.

Suitable active materials also comprise magnetorheological (MR) compositions, such as MR elastomers, which are known as "smart" materials whose rheological properties can rapidly change upon application of a magnetic field. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

Suitable magnetic shape memory materials include, but are not limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper, and the like.

All ranges disclosed herein are inclusive and combinable (e.g., ranges of "up to about 25 wt %, or, more specifically about 5 wt % to about 25 wt %" is inclusive of the endpoints and all intermediate values of the ranges of "about 5 wt % to about 25 wt %," etc.). The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is

1. A tunable vehicle structural member, comprising:
at least one active material portion adapted to selectively undergo a change in at least one attribute in response to an activation signal, wherein the change in at least one attribute changes a mechanical or structural property of the vehicle structural member, and the mechanical or structural property forms a location of crush initiation for the vehicle structural member.

2. The tunable vehicle structural member of claim 1, wherein the mechanical or structural property forms a predetermined buckling path for the vehicle structural member.

3. The tunable vehicle structural member of claim 1, wherein the change in at least one attribute comprises a shape change, a modulus change, or combinations thereof.

4. The tunable vehicle structural member of claim 1, wherein the vehicle structural member comprises localized regions of the at least one active material portion.

5. The tunable vehicle structural member of claim 1, wherein the vehicle structural member is formed of the at least one active material.

6. The tunable vehicle structural member of claim 1, wherein the at least one active material portion comprises a film or a coating.

7. The tunable vehicle structural member of claim 1, further comprising non-active portions, wherein the active material is in operative communication with non-active portions.

8. The tunable vehicle structural member of claim 1, wherein the activation signal comprises a thermal activation signal, a magnetic activation signal, electrical signal, and a combination comprising at least one of the foregoing activation signals.

9. The tunable vehicle structural member of claim 1, wherein the active material comprises a shape memory alloy, a shape memory polymer, a magnetic shape memory material, piezoelectric, electroactive polymer, and a combination comprising at least one of the foregoing active materials.

10. The tunable vehicle structural member of claim 1, wherein the change in the at least one attribute is reversible.

11. The tunable vehicle structural member of claim 1, wherein the change in at least one attribute of the active material comprises morphing a surface or wall of the vehicle structural member.

12. The tunable vehicle structural member of claim 1, wherein the vehicle structural member forms a pillar, a reinforcing member, a rail, a framing member, a sway bar, a chassis member, a bumper component, a strut assembly component, a door panel, a hood panel, a body panel, a deck lid, and combinations thereof.

13. A method for selectively changing a mechanical property of a vehicle structural member, the method comprising:
  applying an activation signal to an active material, wherein the active material is in operative communication with the vehicle structural member; and
  causing a change in at least one attribute of the active material in response to the activation signal, wherein a mechanical or structural property of the vehicle structural member changes with the change in the at least one attribute of the active material, and the mechanical or structural property defines a cross sectional or a longitudinal shape of the vehicle structural member.

14. The method of claim 13, wherein the mechanical or structural property defines a predetermined buckling path for the vehicle structural member.

15. The method of claim 13, wherein the vehicle structural member comprises localized regions of the active material.

16. The method of claim 13, wherein the vehicle structural member is formed of the active material.

17. The method of claim 13, wherein the active material is a film or coating.

18. The method of claim 13, wherein the activation signal comprises a thermal activation signal, a magnetic activation signal, an electrical signal, or a combination comprising at least one of the foregoing activation signals.

19. The method of claim 13, wherein the active material comprises a shape memory alloy, a shape memory polymer, a magnetic shape memory material, piezoelectric, electroactive polymer, and a combination comprising at least one of the foregoing active materials.

20. The method of claim 13, wherein the change in the at least one attribute is reversible.

21. The method of claim 13, wherein the change in at least one attribute of the active material comprises morphing a surface or a wall of the vehicle structural member.

22. A method for providing a predetermined buckling path for a vehicle structural member, comprising:
  applying an activation signal to at least one active material, wherein the at least one active material is in operative communication with non-active portions of the vehicle structural member; and
  changing at least one attribute of the active material in response to the activation signal, wherein the change in the at least one attribute defines the predetermined buckling path for the vehicle structural member.

23. The method of claim 22, wherein the activation signal comprises a thermal activation signal, a magnetic activation signal, electrical signal, and a combination comprising at least one of the foregoing activation signals.

24. The method of claim 22, wherein the active material comprises a shape memory alloy, a shape memory polymer, a magnetic shape memory material, piezoelectric, electroactive polymer, and a combination comprising at least one of the foregoing active materials.

25. The method of claim 22, wherein the change in the at least one attribute is reversible.

* * * * *